United States Patent
Rosales et al.

(10) Patent No.: US 10,005,498 B2
(45) Date of Patent: Jun. 26, 2018

(54) HATCH ACTUATION UNIT OF A MOTOR VEHICLE

(71) Applicant: Brose Schliesssysteme GmbH & Co. KG, Wuppertal (DE)

(72) Inventors: David Rosales, Rochester Hills, MI (US); Michael Wittelsbuerger, Lake Orion, MI (US); Stepan Hanke, Lake Orion, MI (US)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 98 days.

(21) Appl. No.: 15/075,665

(22) Filed: Mar. 21, 2016

(65) Prior Publication Data
US 2017/0089112 A1   Mar. 30, 2017

Related U.S. Application Data

(60) Provisional application No. 62/234,181, filed on Sep. 29, 2015.

(51) Int. Cl.
*B62D 33/037* (2006.01)
*E05F 15/00* (2015.01)
(Continued)

(52) U.S. Cl.
CPC ............ *B62D 33/037* (2013.01); *E05B 79/20* (2013.01); *E05B 81/22* (2013.01); *E05B 83/18* (2013.01);
(Continued)

(58) Field of Classification Search
CPC ....... B62D 33/03; B62D 33/037; E05B 79/20; E05B 81/22; E05F 15/22; E05F 15/622
(Continued)

(56) References Cited

U.S. PATENT DOCUMENTS

| 4,806,712 A | 2/1989 | Hoffman et al. |
| 5,639,130 A | 6/1997 | Rogers, Jr. et al. |

(Continued)

FOREIGN PATENT DOCUMENTS

| DE | 202012004789 | 10/2013 |
| EP | 1700989 | 9/2006 |
| WO | 2012059161 | 5/2012 |

OTHER PUBLICATIONS

Final Office Action for U.S. Appl. No. 14/832,236 dated Nov. 2, 2016 (9 pages).
(Continued)

*Primary Examiner* — Jason S Morrow
(74) *Attorney, Agent, or Firm* — Pauly, DeVries Smith & Deffner LLC

(57) ABSTRACT

The invention relates to a hatch actuation unit of a motor vehicle for a drive based opening and closing of a hatch leaf comprising a hatch drive arrangement for moving the hatch leaf in an opening sequence from a closed hatch position into an open hatch position and in a closing sequence from an open hatch position into a closed hatch position, a first closing element for engaging a second closing element for closing of the hatch leaf in a cinching subsequence of the closing sequence, wherein the first closing element is driven by the hatch drive arrangement in the cinching subsequence of the closing sequence.

20 Claims, 4 Drawing Sheets

(51) Int. Cl.
  *E05B 81/22* (2014.01)
  *E05B 79/20* (2014.01)
  *E05B 83/18* (2014.01)
(52) U.S. Cl.
  CPC .......... *E05F 15/00* (2013.01); *E05Y 2201/40* (2013.01); *E05Y 2201/71* (2013.01); *E05Y 2900/531* (2013.01); *E05Y 2900/546* (2013.01)
(58) Field of Classification Search
  USPC .................................. 296/146.4, 146.8, 57.1
  See application file for complete search history.

(56) References Cited

U.S. PATENT DOCUMENTS

| | | | |
|---|---|---|---|
| 5,938,252 A | 8/1999 | Kondo et al. | |
| 6,053,542 A | 4/2000 | Bastien et al. | |
| 6,123,372 A | 9/2000 | Rogers, Jr. et al. | |
| 6,125,583 A | 10/2000 | Daniels et al. | |
| 6,256,932 B1 | 7/2001 | Wludyka et al. | |
| 6,382,687 B1 | 5/2002 | Gruhn | |
| 6,435,600 B1 | 8/2002 | Williams, Jr. et al. | |
| 6,505,867 B1 | 1/2003 | Geurden et al. | |
| 6,520,548 B1 | 2/2003 | Kalsi et al. | |
| 6,679,531 B2 | 1/2004 | Rogers, Jr. et al. | |
| 6,719,556 B2 | 4/2004 | Cleland et al. | |
| 7,059,640 B2 | 6/2006 | Tensing et al. | |
| 8,474,887 B2 | 7/2013 | Suzuki et al. | |
| 9,677,318 B2* | 6/2017 | Rosales | E05F 15/70 |
| 2002/0040551 A1 | 4/2002 | Zhou et al. | |
| 2004/0124662 A1 | 7/2004 | Cleland et al. | |
| 2004/0212210 A1* | 10/2004 | Roach | B62D 33/0273 296/57.1 |
| 2005/0155289 A1 | 7/2005 | Oberheide et al. | |
| 2006/0181108 A1 | 8/2006 | Cleland et al. | |
| 2007/0079556 A1 | 4/2007 | Oberheide et al. | |
| 2011/0057469 A1* | 3/2011 | Zielinsky | B60P 1/267 296/57.1 |
| 2012/0299313 A1 | 11/2012 | Organek et al. | |
| 2015/0283886 A1 | 10/2015 | Nania | |
| 2016/0052376 A1* | 2/2016 | Rosales | E05F 15/70 49/31 |
| 2016/0312500 A1* | 10/2016 | Hiramoto | E05B 81/90 |

OTHER PUBLICATIONS

Non Final Office Action for U.S. Appl. No. 14/832,236 dated Mar. 2, 2016 (9 pages).

* cited by examiner

HATCH ACTUATION UNIT OF A MOTOR VEHICLE

CLAIM OF PRIORITY

This application claims the benefit of U.S. Provisional Application No. 62/234,181, filed Sep. 29, 2015, the content of which is herein incorporated by reference in its entirety.

FIELD OF THE TECHNOLOGY

The application is directed at a hatch actuation unit of a motor vehicle, a hatch arrangement of a motor vehicle, a motor vehicle according and a method.

BACKGROUND

From the prior art different hatch actuation units of motor vehicles are known. In reference EP 1 700 989 A2 a hatch actuation unit of a motor vehicle is described. It comprises a hatch drive arrangement for moving the hatch leaf in a closing sequence from an open hatch position into a closed hatch position. It further comprises a cinching mechanism which is actuated by the hatch drive arrangement. The described hatch actuation unit of a motor vehicle cannot move the hatch leaf from a closed hatch position into an open hatch position. This restricts the ease of use significantly, since the hatch leaf has to be opened manually.

From WO 2012/059161 A1 a hatch actuation unit of a motor vehicle is known which comprises a hatch drive arrangement for moving the hatch leaf in an opening sequence from a closed hatch position into an open hatch position and in a closing sequence from an open hatch position into a closed hatch position. It further comprises a cinching mechanism which is actuated by a second drive arrangement. This hatch actuation unit is relatively complex and costly.

SUMMARY

It is therefore the object of the invention to provide a hatch actuation unit of a motor vehicle, a hatch arrangement of a motor vehicle, a motor vehicle as well as a method for a drive based opening and closing of a hatch leaf, which is comfortable to use and which may be realized with low costs.

The above noted object is solved for a hatch actuation unit of a motor vehicle as described herein. Further the above noted object is achieved by a method as described herein.

The basic idea underlying the invention is to be able to use a regular hatch drive arrangement of the state in the art, which is capable of moving the hatch leaf in an opening sequence from a closed hatch position into an open hatch position and in a closing sequence from an open hatch position into a closed hatch position and additionally to drive a first closing element with the hatch drive arrangement in a cinching subsequence of the closing sequence. In the cinching subsequence of the closing sequence the first closing element is engaging a second closing element for moving the hatch leaf into a fully closed position.

The result is a simple construction which obviates the need for an additional actuator to the already existing hatch drive arrangement and for complicated signal processing, which leads to a cost effective approach. Another benefit is that one and the same hatch actuation unit may be interchangeably used for a system with or without cinching function.

Various embodiments describe different designs regarding the first and second closing element. These designs enable a robust cinching subsequence.

Some embodiments couple the first closing element to the hatch drive arrangement. Those embodiments allow, for example, that the engagement between the first closing element and the second closing element only takes place, when the hatch leaf is almost fully closed, such that those closing elements only provide for the final section of the closing sequence.

Various embodiments of the hatch drive arrangement are described. These allow a simple and robust actuation of the hatch leaf.

An embodiment described herein provides a hatch actuation unit of a motor vehicle for a drive based opening and closing of a hatch leaf, wherein a hatch drive arrangement is provided for moving the hatch leaf in an opening sequence from a closed hatch position to into an open hatch position and in a closing sequence from an open hatch position into a closed hatch position, wherein a first closing element is provided, which is engageable with a second closing element for closing of the hatch leaf in a cinching subsequence of the closing sequence and wherein the first closing element is driven by the hatch drive arrangement in the cinching subsequence of the closing sequence.

In an embodiment, the first closing element is a cinching catch and the second closing element is a cinching striker, such that the cinching catch is a lock catch and the cinching striker is a lock striker.

In an embodiment, the first closing element is a cinching striker and the second closing element is a cinching catch, such that the cinching striker is a lock striker and the cinching catch is a lock catch.

In an embodiment, the cinching catch is pivotable towards a closed catch position for engaging the cinching striker in a retaining manner and towards an open catch position for disengaging the cinching striker, such that the cinching catch is pivotable around a catch axis.

In an embodiment, the first closing element is coupled or may be coupled drivingly to the hatch drive arrangement, such as the first closing element is drivingly coupled or may be drivingly coupled to the hatch drive arrangement during the cinching subsequence of the closing sequence.

In an embodiment, the first closing element is drivingly uncoupled from the hatch drive arrangement during a first section of the closing sequence preceding the cinching subsequence.

In an embodiment, during the closing sequence the first closing element is being drivingly coupled to the hatch drive arrangement after a specified way of movement of the hatch drive arrangement.

In an embodiment, the first closing element is drivingly coupled or may be drivingly coupled to the hatch drive arrangement via a flexible traction mechanism, such as via a cable, in particular a Bowden cable, a wire a rope, a belt or the like.

In an embodiment, the coupling of the first closing element to the hatch drive arrangement is achieved by a coupling contour on the side of the hatch drive arrangement, which comes into driving engagement with a counter coupling contour on the side of the first closing element at the beginning of the cinching subsequence.

In an embodiment, the hatch drive arrangement comprises a linear drive unit, such as a spindle drive unit.

In an embodiment, the hatch drive arrangement comprises a hatch drive gear, such as a lever mechanism.

In an embodiment, the first closing element is coupled to the drive unit or the hatch drive gear, such as to a transmission lever of the hatch drive gear.

In an embodiment, the hatch arrangement comprises a hatch actuation unit for drive based opening and closing of the hatch leaf according to one of the preceding claims.

An embodiment described herein includes a motor vehicle with a hatch arrangement as described.

An embodiment described herein provides a method for a drive based closing of a hatch leaf of a hatch arrangement of a motor vehicle, comprising the steps of moving the hatch leaf in a closing sequence from an open hatch position into a closed hatch position via a hatch drive arrangement and engaging a second closing element by a first closing element for closing of the hatch leaf in a cinching subsequence of the closing sequence, wherein the first closing element is actuated by the hatch drive arrangement.

BRIEF DESCRIPTION OF THE FIGURES

In the following the invention will be described with reference to a single exemplary embodiment illustrated in the drawings. The drawings show in FIG. 1 a schematic view of a motor vehicle with a hatch actuation unit according to the proposal, FIG. 2 the hatch actuation unit shown in FIG. 1 at the beginning of the closing sequence, FIG. 3 the hatch actuation unit of FIG. 1 at the beginning of the cinching subsequence and FIG. 4 the hatch actuation unit of FIG. 2 at the end of the cinching sequence.

DETAILED DESCRIPTION

Figure 1:
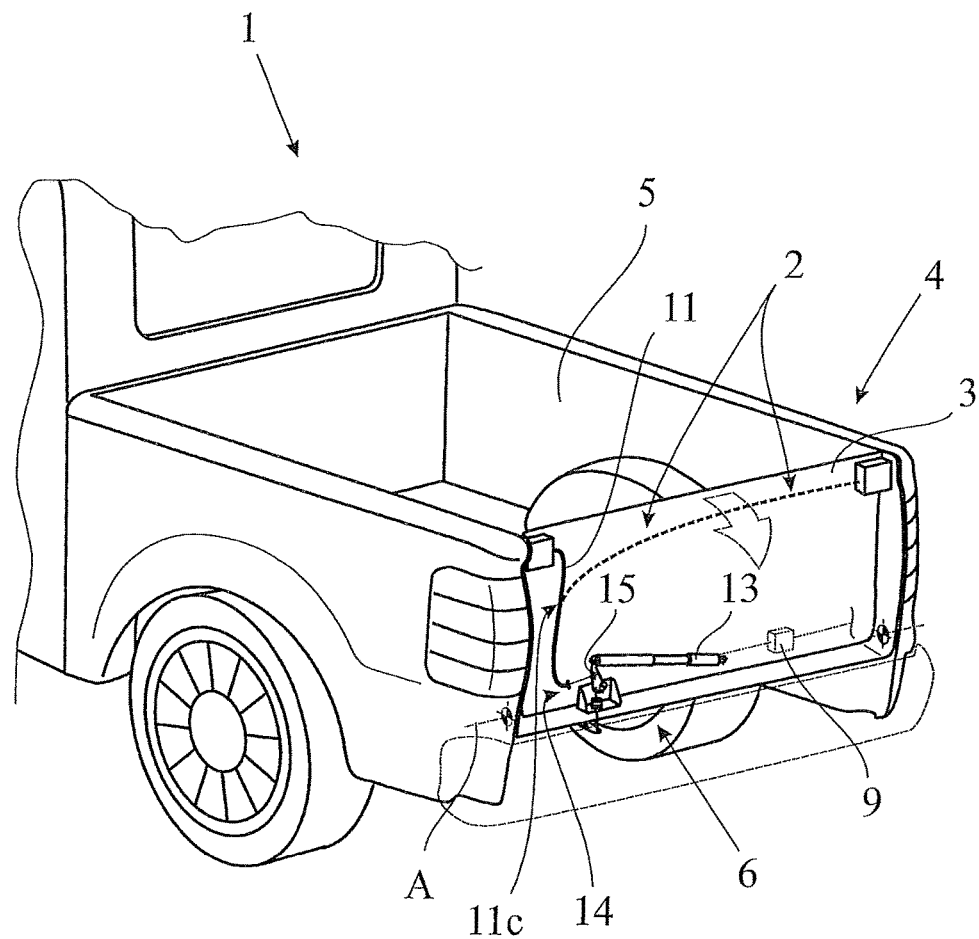

The motor vehicle 1 shown in FIG. 1 comprises a hatch actuation unit 2 for a drive based opening and closing of a hatch leaf 3. The hatch actuation unit 2 and the hatch leaf 3 are part of a hatch arrangement 4.

Presently, the expression "hatch leaf" is to be understood in a broad sense. It includes in particular any kind of doors of a motor vehicle 1 such as side doors or back doors as well as tailgates, lift gates, trunk lids or engine hoods. Here the hatch leaf 3 is rotatably mounted on the body 5 of the motor vehicle 1 with respect to a hatch axis A. It is designed as a pickup truck tailgate, which is to be understood as an embodiment.

The hatch actuation unit 2 of the motor vehicle 1 may be associated to the body 5 of the motor vehicle 1, or, as in the embodiment shown in FIGS. 1 to 4, to the hatch leaf 3 of the motor vehicle 1, forming a hatch arrangement 4.

The hatch actuation unit 2 of a motor vehicle 1 comprises a hatch drive arrangement 6 for moving the hatch leaf 3 in an opening sequence from a closed hatch position into an open hatch position and in a closing sequence from an open hatch position into a closed hatch position. The closing sequence corresponds to the sequence of FIGS. 2, 3 and 4.

Figure 2:
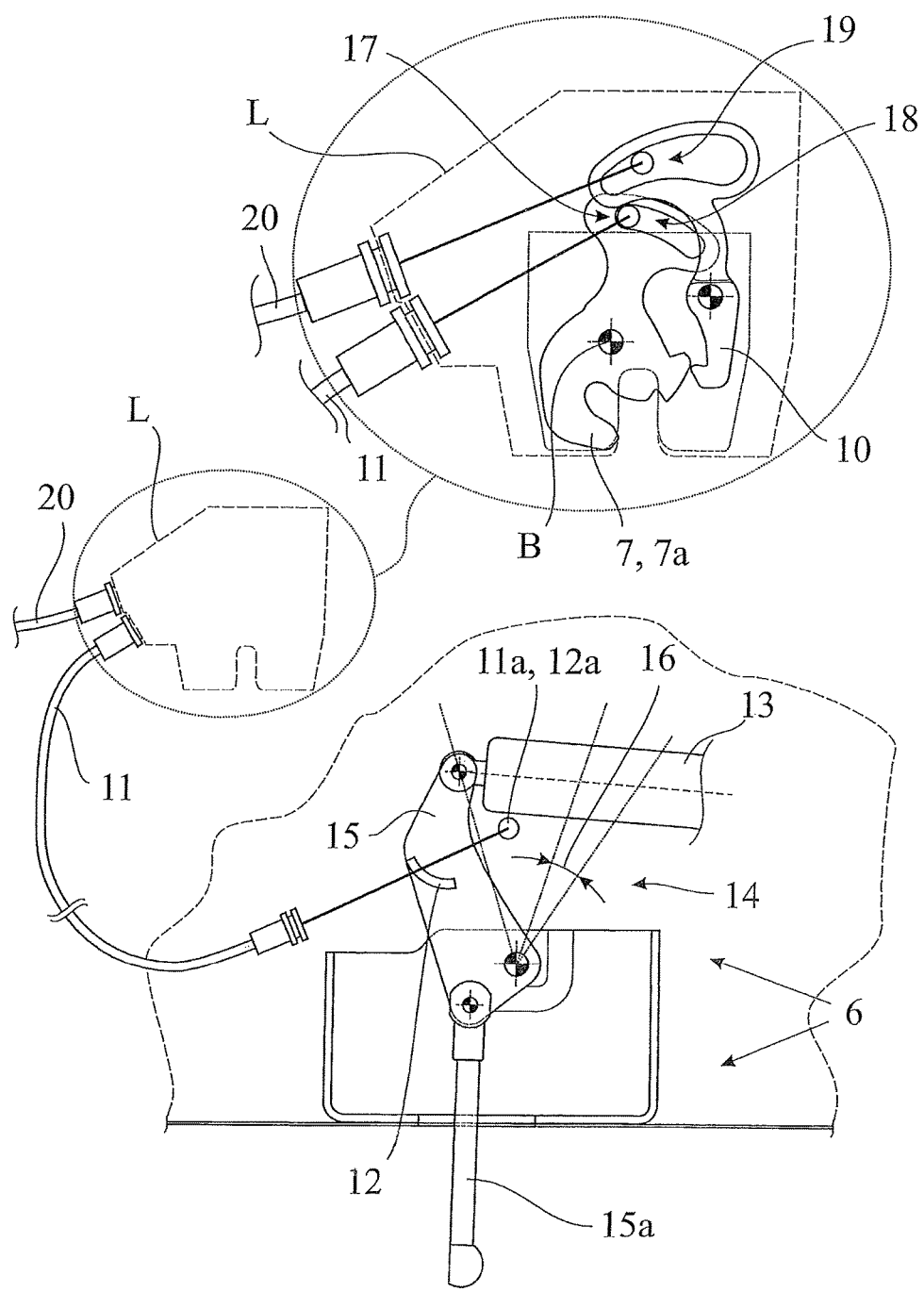

If the hatch leaf 3 is in an open hatch position shown in FIG. 2, the interior of the motor vehicle 1, such as the trunk, the passenger compartment, the engine compartment or, as is shown in the FIG. 1, the pickup truck loading bed, is reachable for a user through the opening to be closed in a closed hatch position.

The closing sequence comprises a first section in which the main movement of the hatch leaf 3 is performed. In the final section of the closing sequence, the forces needed to move the hatch leaf 3 into the fully closed position rise considerably due to effects like the compression of seals that are assigned to the hatch leaf 3. In this final section a cinching mechanism is realized, which comes into effect during the cinching subsequence.

For realizing the cinching subsequence, the hatch actuation unit 2 comprises a first closing element 7 engaging a second closing element 8, which engagement allows the generation of high forces for pulling the hatch leaf 3 into the fully closed position. The first closing element 7 and the second closing element 8 together provide a cinching mechanism. The cinching subsequence provides the final section of the closing sequence as noted above, which is shown in FIG. 4.

It has been found according to the invention that the hatch drive arrangement 6 may be used not only to perform the above noted first section of the closing sequence, but also to perform the cinching subsection of the closing section. In further detail, the first closing element 7 is driven by the hatch drive arrangement 6 in the cinching subsequence of the closing sequence, in order to move the hatch leaf 3 into its fully closed position. Again this may be taken from FIG. 4.

If the hatch actuation unit 2 is associated to the body 5 of the motor vehicle 1 the second closing element 7 can be associated to the hatch leaf 3. Here, however, the hatch actuation unit 2 is associated to the hatch leaf 3, such that the second closing element 8 can be associated to the body 5 of the motor vehicle 1.

The closing sequence includes the complete movement of the hatch leaf 3 from the respective open position into the fully closed position. The cinching subsequence, according to the above, comprises only a part of this sequence. In an embodiment, the cinching subsequence is less than 15%, such as less than 10%, or less than 5% of the closing sequence with respect to the movement of the hatch leaf 3. As noted above, the cinching subsequence can provide the final section of the closing sequence.

The closing sequence as well as the opening sequence can be controlled by a control unit 9 of the hatch actuation unit 2, which may well be part of a centralized control unit of the motor vehicle 1. The control unit 9 accordingly controls the driving movement of the hatch drive arrangement 6.

In the embodiment shown in FIGS. 1 to 4, the first closing element 7 is a cinching catch 7a and the second closing element 8 is a cinching striker 8a. In an embodiment the cinching catch 7a is a lock catch and the cinching striker is a lock striker, as is shown in FIGS. 1 to 4. This means, that the first closing element 7 and the second closing element are each assigned to a motor vehicle lock L. FIG. 1 shows, that two motor vehicle locks L and accordingly two sets of first closing element 7 and second closing element 8 are provided. In the following, only one motor vehicle lock L with included first closing element 7 is described for a simplified presentation.

In the embodiment shown in FIGS. 1 to 4, the cinching catch 7a is pivotable towards a closed catch position (FIG. 4) for engaging the cinching striker 8a in a retaining manner and towards an open catch position (FIG. 3) for disengaging the cinching striker 8a. The cinching catch 7a can be pivotable around a catch axis B.

Figure 4:
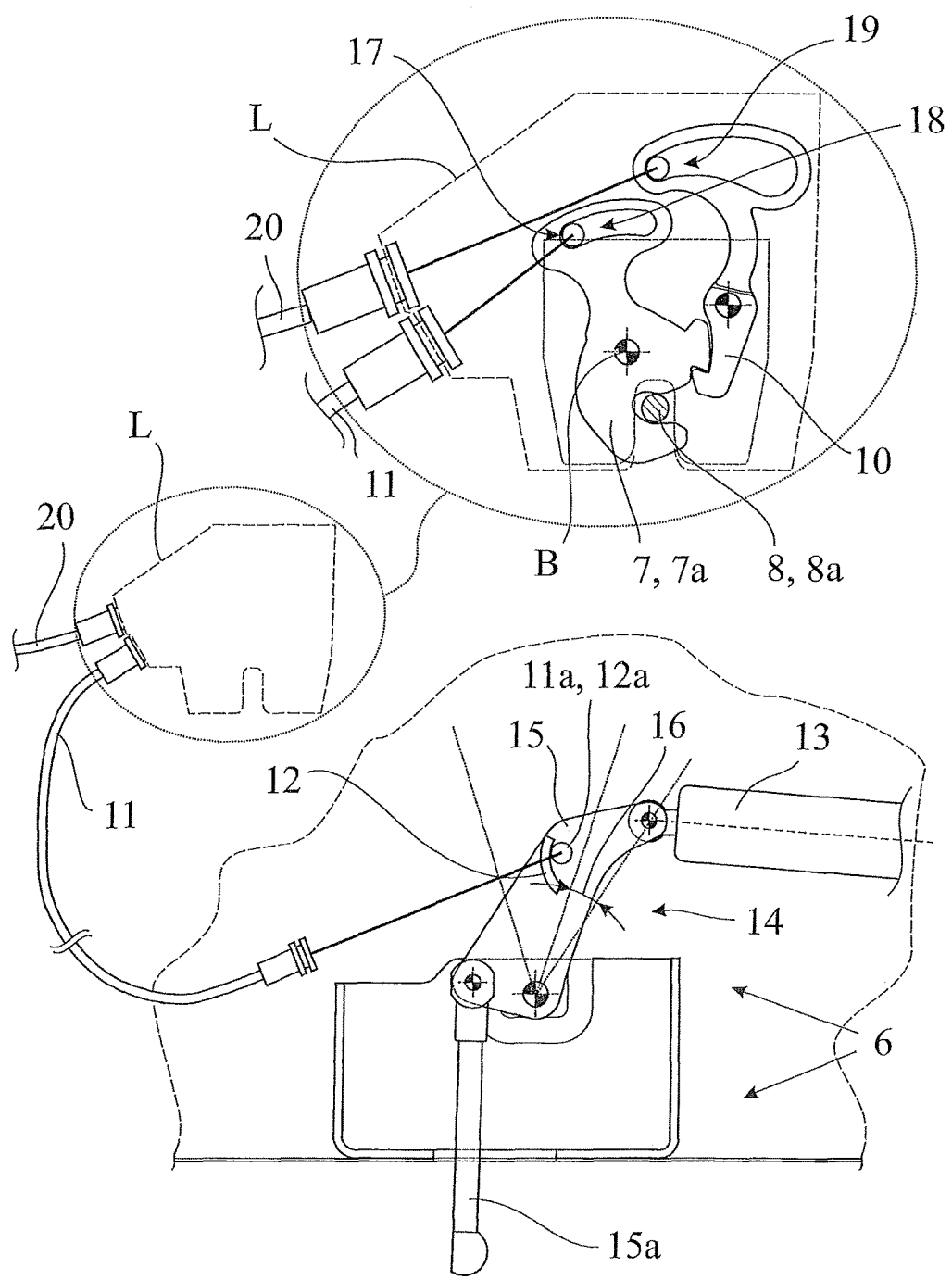

Here the hatch actuation unit 2, in further detail the motor vehicle lock L, further comprises a pawl 10 for retaining the cinching catch 7a in a closed catch position as shown in FIG. 4.

Figure 3:
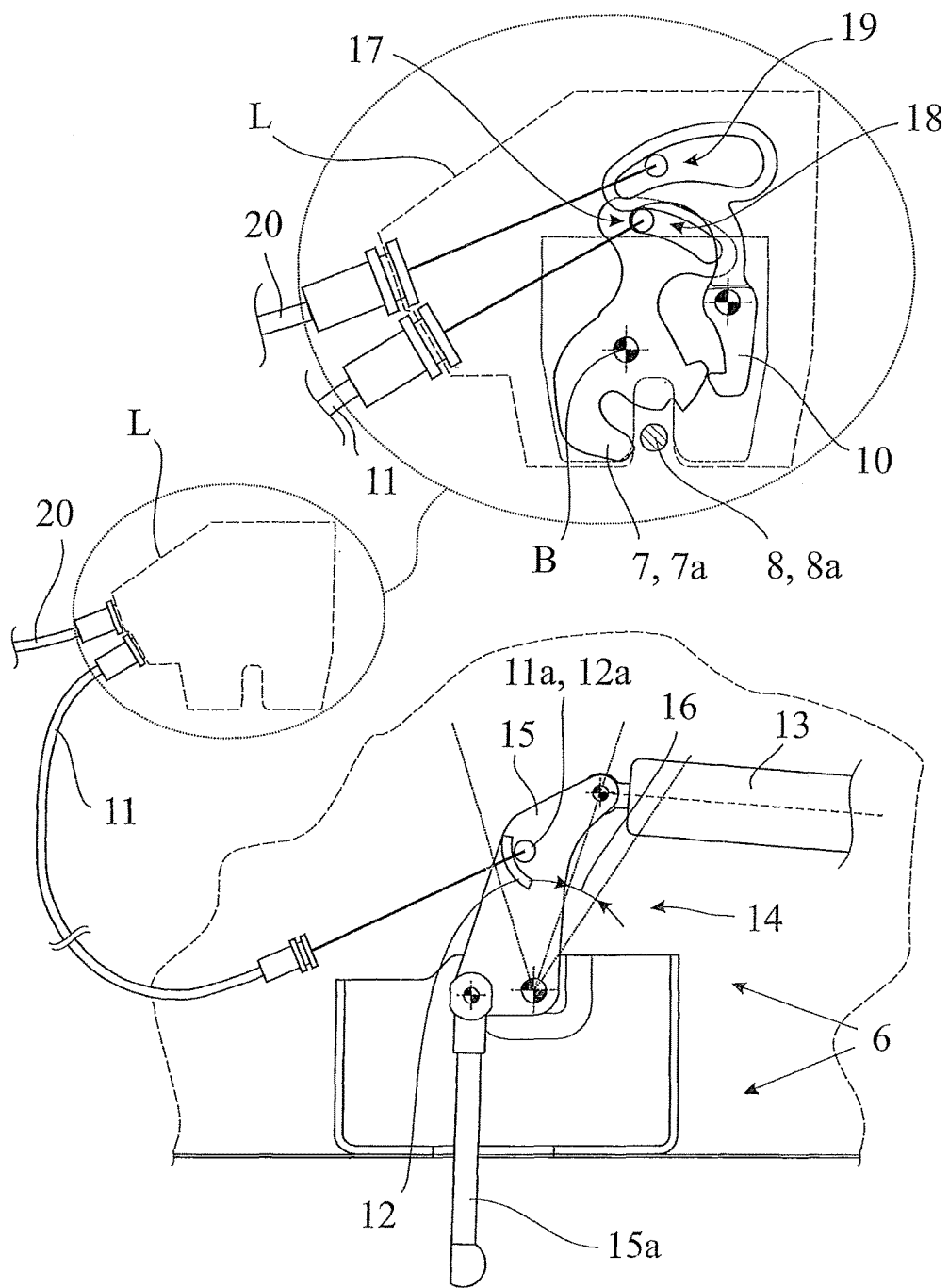

In an embodiment, the cinching catch and the pawl 10 are designed such that two closed positions are provided. A primary closed catch position (not shown) and a main closed catch position (FIG. 4). Here, the cinching subsequence starts from the open catch position (FIG. 3). However, it may also be foreseen that the cinching subsequence starts from a primary closed catch position.

During the cinching subsequence the first closing element 7, here the cinching catch 7a, is pivoted around the catch axis B, in FIG. 3 in counter clockwise direction, pulling the second locking element 8, here the cinching striker 8a, into a closing direction, such that the hatch leaf 3 is being pulled into its fully closed position. In FIG. 4, the cinching striker 8a is being pulled upwards during the cinching subsequence. This movement of the cinching catch 7a is driven by the hatch drive arrangement 6, as will be explained later.

When the closed catch position is reached as shown in FIG. 4, the pawl 10 falls spring driven into engagement with the cinching catch 7a, holding the cinching catch 7a in its closed catch position. In order to ensure safe engagement between the pawl 10 and the cinching catch 7a, it is provided that during the cinching subsequence the cinching catch 7a is being driven slightly beyond the closed catch position in an overtravel position. This allows the pawl 10 to fall into engagement with the cinching catch 7a without having to overcome any friction between those two components.

As noted above, the cinching subsequence is driven by the hatch drive arrangement 6, which also drives the first section of the closing sequence. For driving the cinching subsequence, the drive arrangement 6 has to be drivingly coupled to the cinching mechanism, in particular to the first closing element 7, here the cinching catch 7a. The basic idea of the shown solution is to provide a freewheel mechanism between the drive arrangement 6 and the first closing element 7, which, during the first section of the closing sequence, causes the drive arrangement 6 to run free from the first closing element 7 and which, during the cinching subsequence, causes the drive arrangement 6 to come into driving engagement with the first closing element 7, in order to drive the first closing element 7 and thereby the hatch leaf 3 into their respective closing directions. The freewheel mechanism will be explained in the following.

First of all, generally, for driving the first closing element 7 it is coupled or may be coupled drivingly to the hatch drive arrangement 6. Here, the first closing element 7 is drivingly coupled or may be drivingly coupled to the hatch drive arrangement 6 during the cinching subsequence of the closing sequence.

In order to realize the above noted freewheel mechanism, here, the first closing element 7 is drivingly uncoupled from the hatch drive arrangement 6 during a first section of the closing sequence preceding the cinching subsequence. Accordingly, the above noted freewheel mechanism requires a selective coupling between the hatch drive arrangement 6 and the closing element 7.

Depending on the realization of the cinching mechanism, the first closing element 7 is being drivingly coupled to the hatch drive arrangement 6 after a specified way of movement of the hatch drive arrangement 6, which specific way of movement corresponds to the first section of the closing sequence.

The transmission of the driving movements from the hatch drive arrangement 6 and the first closing element 7 in the shown embodiment is realized in a way, that allows a maximum in constructional flexibility as far as the positioning of the closing elements 7, 8 is concerned. For this, the first closing element 7 can be drivingly coupled or may be drivingly coupled to the hatch drive arrangement 6 via a flexible traction mechanism 11. The flexible traction mechanism 11 may comprise a cable, in particular a Bowden cable, a rope, a belt or the like for the transmission of drive movements. Here the flexible traction mechanism 11 is a Bowden cable.

In an embodiment, the coupling of the first closing element 7 and the hatch drive arrangement 6 is achieved by a coupling contour 12 on the side of the hatch drive arrangement 6, which comes into driving engagement with a counter coupling contour 12a on the side of the first closing element 7 at the beginning of the cinching subsequence.

In the shown embodiment, the counter coupling contour 12a is provided by the end part 11a of the flexible traction mechanism 11, here of the inner cable of the Bowden cable. The above noted selective coupling may easily be realized by providing this inner cable with a respective length, which defines the freewheel movement of the resulting freewheel mechanism.

The hatch drive arrangement 6 comprises a drive unit 13, which here is a linear drive unit. In the embodiment of FIGS. 1 to 4 the drive unit is a spindle drive unit.

Alternatively or additionally the hatch drive arrangement 6 may comprise a hatch drive gear 14, which is drivingly arranged between the drive unit 13 and the hatch leaf 3. As shown in FIGS. 2 to 4, the hatch drive gear 14 is a lever mechanism. The hatch drive gear 14 transmits drive movements of the drive unit 13 to the hatch leaf 3 via the transmission lever 15 of the hatch drive gear 14.

In the shown embodiment it is interesting that the hatch drive gear 14 serves two purposes. The first purpose is to transmit drive movements of the drive unit 13 to the hatch leaf 3 as noted above. For this first purpose, the transmission lever 15 is coupled to a push rod 15a, which again is coupled to the body of the motor vehicle 1. The second purpose is the above noted, selective coupling between the hatch drive arrangement 6, in particular the drive unit 13, and the first closing element 7. For this second purpose, again the transmission lever 15 is coupled to the first closing element 7, here via the flexible traction mechanism 11.

Also interesting is the fact that one and the same transmission lever 15 is coupled to the drive unit 13, to the hatch leaf 3 and to the first closing element 7 in order to fulfil the above noted two purposes.

On the side of the first closing element 7 the flexible traction mechanism 11 can be coupled at a coupling point 17 to the cinching catch 7a. For this coupling a coupling element 11b is provided at the first closing element sided end of the flexible traction mechanism 11. At the coupling point 17 a freewheel mechanism 18 is realized in order to allow manual closing of the hatch leaf 3, in particular when the push rod 15a is being decoupled from the body of the motor vehicle 1 or the drive unit 13. Especially, if the first closing element 7 is a cinching catch 7a as shown in the drawings, the coupling point 17 can be offset to the catch axis B.

The pawl 10 may be moved out of engagement from the cinching catch 7a via another flexible traction mechanism 20, which may be connected to a manual or motorized pawl actuation unit (not shown). Here, a freewheel mechanism 19 between the flexible traction mechanism 20 and the pawl 10 is provided, which freewheel mechanism 19 allows the pawl 10 to fall into engagement with the cinching catch 7a without being hindered by the pawl actuation unit.

In further embodiments, the hatch drive arrangement 6 may drive two or more first closing elements 7, as indicated in FIG. 1, which are each part of a respective motor vehicle lock L. The two or more first closing elements 7 may then be operated by one hatch drive arrangement 6, which drive movements are being transferred to the first closing elements via a flexible traction mechanism 11 with a Y-junction 11c.

In another embodiment, a hatch actuation unit 2 may comprise two hatch drive arrangements 6 for operating two first closing elements 7, such as one first closing element 7 for each hatch drive arrangement 6.

The invention claimed is:

1. A hatch actuation unit of a motor vehicle for a drive based opening and closing of a hatch leaf, wherein a hatch drive arrangement is provided for moving the hatch leaf in an opening sequence from a closed hatch position into an open hatch position and in a closing sequence from an open hatch position into a closed hatch position, wherein a first closing element is provided, which is engageable with a second closing element for closing of the hatch leaf in a cinching subsequence of the closing sequence and wherein the first closing element is driven by the hatch drive arrangement in the cinching subsequence of the closing sequence.

2. The hatch actuation unit according to claim 1, wherein the first closing element is a cinching catch and the second closing element is a cinching striker.

3. The hatch actuation unit according to claim 1, wherein the first closing element is a cinching striker and the second closing element is a cinching catch.

4. The hatch actuation unit according to claim 2, wherein the cinching catch is pivotable towards a closed catch position for engaging the cinching striker in a retaining manner and towards an open catch position for disengaging the cinching striker.

5. The hatch actuation unit according to claim 1, wherein the first closing element is selectively coupled to the hatch drive arrangement.

6. The hatch actuation unit according to claim 1, wherein the first closing element is drivingly uncoupled from the hatch drive arrangement during a first section of the closing sequence preceding the cinching subsequence.

7. The hatch actuation unit according to claim 1, wherein during the closing sequence the first closing element is being drivingly coupled to the hatch drive arrangement after a specified way of movement of the hatch drive arrangement.

8. The hatch actuation unit according to claim 1, wherein the first closing element is selectively and drivingly coupled to the hatch drive arrangement via a flexible traction mechanism.

9. The hatch actuation unit according to claim 1, wherein the coupling of the first closing element to the hatch drive arrangement is achieved by a coupling contour on the side of the hatch drive arrangement, which comes into driving engagement with a counter coupling contour on the side of the first closing element at the beginning of the cinching subsequence.

10. The hatch actuation unit according to claim 1, wherein the hatch drive arrangement comprises a linear drive unit.

11. The hatch actuation unit according to claim 1, wherein the hatch drive arrangement comprises a hatch drive gear.

12. The hatch actuation unit according to claim 1, wherein the first closing element is coupled to the drive unit or the hatch drive gear.

13. The hatch arrangement of a motor vehicle with a hatch leaf, wherein it comprises a hatch actuation unit for drive based opening and closing of the hatch leaf according to claim 1.

14. A motor vehicle with a hatch arrangement according to claim 13.

15. A method for a drive based closing of a hatch leaf of a hatch arrangement of a motor vehicle, comprising the steps of moving the hatch leaf in a closing sequence from an open hatch position into a closed hatch position via a hatch drive arrangement and engaging a second closing element by a first closing element for closing of the hatch leaf in a cinching subsequence of the closing sequence, wherein the first closing element is actuated by the hatch drive arrangement.

16. The hatch actuation unit according to claim 2, wherein the cinching catch is a lock catch and the cinching striker is a lock striker.

17. The hatch actuation unit according to claim 3, wherein the cinching striker is a lock striker and the cinching catch is a lock catch.

18. The hatch actuation unit according to claim 3, wherein the cinching catch is pivotable towards a closed catch position for engaging the cinching striker in a retaining manner and towards an open catch position for disengaging the cinching striker.

19. The hatch actuation unit according to claim 2, wherein the cinching catch is pivotable around a catch axis.

20. The hatch actuation unit according to claim 5, wherein the first closing element is drivingly coupled to the hatch drive arrangement during the cinching subsequence of the closing sequence.

* * * * *